United States Patent
Malovany et al.

(10) Patent No.: US 10,645,663 B2
(45) Date of Patent: *May 5, 2020

(54) BLUETOOTH MEDIA DEVICE TIME SYNCHRONIZATION

(71) Applicant: Texas Instruments Incorporated, Dallas, TX (US)

(72) Inventors: Ram Malovany, Nes Ziona (IL); Chen Loewy, Herzelia (IL); Dotan Ziv, Tel Aviv (IL); David Levy, Ramat Gan (IL)

(73) Assignee: TEXAS INSTRUMENTS INCORPORATED, Dallas, TX (US)

(*) Notice: Subject to any disclaimer, the term of this patent is extended or adjusted under 35 U.S.C. 154(b) by 0 days.

This patent is subject to a terminal disclaimer.

(21) Appl. No.: 16/017,768

(22) Filed: Jun. 25, 2018

(65) Prior Publication Data

US 2019/0075530 A1  Mar. 7, 2019

Related U.S. Application Data

(63) Continuation of application No. 15/697,023, filed on Sep. 6, 2017, now Pat. No. 10,009,862.

(51) Int. Cl.
*H04W 56/00* (2009.01)
*H04R 27/00* (2006.01)
(Continued)

(52) U.S. Cl.
CPC ............ *H04W 56/001* (2013.01); *H04R 3/12* (2013.01); *H04R 27/00* (2013.01); *H04W 4/80* (2018.02);
(Continued)

(58) Field of Classification Search
CPC ...... H04W 56/001; H04W 4/008; H04R 3/12; H04R 27/00
See application file for complete search history.

(56) References Cited

U.S. PATENT DOCUMENTS

| 8,681,822 B2 | 3/2014 | Bradley et al. |
| 8,699,406 B1 | 4/2014 | Charles et al. |

(Continued)

FOREIGN PATENT DOCUMENTS

WO    WO213032578 A1    3/2013

OTHER PUBLICATIONS

Patent Prosecution History from U.S. Appl. No. 15/697,023, from Sep. 6, 2017 to Jun. 7, 2018 (118 pages).

(Continued)

*Primary Examiner* — Devan A Sandiford
(74) *Attorney, Agent, or Firm* — Ebby Abraham; Charles A. Brill; Frank D. Cimino (57) ABSTRACT

Synchronized media streaming in a device chain including first, second and third Bluetooth media device having a controller and time synchronization algorithm. The first device formats a first media packet including received media data, second device address, and synchronization information including packet start time including a delay time and cumulative clock drift counted thus far. The second device receives the first packet and formats a second packet including the media data, third device address, updated synchronization information including the second packet's play start time, local clock time, clock drift, and a cumulative clock drift counted thus far. The second device transmits the second packet to the third device. The synchronization algorithms begin synchronized playing of the media data including the first device playing after the delay time, second device playing after the first packet's play start time, and the third device playing after the second packet's play start time.

15 Claims, 6 Drawing Sheets

(51) Int. Cl.
  *H04R 3/12* (2006.01)
  *H04W 4/80* (2018.01)
(52) U.S. Cl.
  CPC .... *H04R 2227/005* (2013.01); *H04R 2420/07* (2013.01)

(56) References Cited

U.S. PATENT DOCUMENTS

| | | |
|---|---|---|
| 9,207,905 B2 | 12/2015 | Millington |
| 9,307,508 B2 | 4/2016 | Daley et al. |
| 9,313,591 B2 | 4/2016 | Sheen |
| 9,684,485 B2 | 6/2017 | Vega-Zayas et al. |
| 9,712,229 B2 | 7/2017 | McCune et al. |
| 9,729,630 B2 | 8/2017 | Bradley et al. |
| 9,779,613 B2 | 10/2017 | Bates |
| 9,813,829 B2 | 11/2017 | Sheen |
| 9,848,069 B2 | 12/2017 | Geboff et al. |
| 9,860,581 B2 | 1/2018 | Stokking et al. |
| 2002/0136198 A1 | 9/2002 | Findikli |
| 2003/0152110 A1 | 8/2003 | Rune |
| 2005/0007985 A1 | 1/2005 | Park et al. |
| 2005/0160270 A1 | 7/2005 | Goldberg et al. |
| 2005/0188103 A1 | 8/2005 | Chen |
| 2007/0025481 A1 | 2/2007 | Ryu et al. |
| 2007/0133810 A1 | 6/2007 | Kishi et al. |
| 2010/0086093 A1 | 4/2010 | Sheet |
| 2011/0129048 A1 | 6/2011 | Barbe et al. |
| 2012/0058727 A1 | 3/2012 | Cook et al. |
| 2014/0029701 A1 | 1/2014 | Newham et al. |
| 2014/0323036 A1 | 10/2014 | Daley et al. |
| 2014/0355582 A1 | 12/2014 | Kamath et al. |
| 2015/0092585 A1 | 4/2015 | Shao et al. |
| 2015/0092642 A1 | 4/2015 | Geboff et al. |
| 2015/0256613 A1 | 9/2015 | Walker et al. |
| 2016/0150320 A1 | 5/2016 | Hetke et al. |
| 2016/0196106 A1 | 7/2016 | Hammer et al. |
| 2017/0019197 A1 | 1/2017 | Rajapakse et al. |
| 2017/0188152 A1 | 6/2017 | Watson et al. |
| 2017/0265134 A1 | 9/2017 | Kamath et al. |
| 2018/0124719 A1* | 5/2018 | Kim ................ H04L 12/46 |

OTHER PUBLICATIONS

Notification of Transmittal of the International Search Report and the Written Opinion of the International Searching Authority, or the Declaration; PCT/US 2018/049752; dated Jun. 27, 2019; 8 pages.

\* cited by examiner

FIG. 6

BLUETOOTH MEDIA DEVICE TIME SYNCHRONIZATION

CROSS REFERENCE TO RELATED APPLICATIONS

This application is a continuation of U.S. patent application Ser. No. 15/697,023, filed Sep. 6, 2017, which is incorporated herein by reference in its entirety.

FIELD

Disclosed embodiments relate generally to the field of wireless communications, and more particularly to techniques for wireless device communication of media data (video or audio data) using Bluetooth.

BACKGROUND

Bluetooth (BT) is an example of an ad-hoc networking technology which is the wireless communication standard generally used when transferring information between two or more devices that are near to one another when speed is not an issue, including telephones, printers, modems and headsets. BT is well suited for low-bandwidth applications including transferring sound data with telephones (e.g., with a BT headset) or byte data with hand-held computers (transferring files) or from keyboards or mice. The BT Special Interest Group (SIG) specification may be used for these communications.

BT devices support high quality audio distribution. A conventional use case is the streaming of music content from a stereo music player to headphones or speakers. The audio data is compressed in a proper format for efficient use of the limited bandwidth. Another use case is the synchronizing of the picture and speech in a movie, for example.

A BT profile is a specification regarding an aspect of BT-based wireless communication between devices. The BT profile resides on top of the BT core specification and optionally other additional protocols. The Audio/Video Distribution Transport Protocol (AVDTP) comprises a signaling entity for negotiation of audio streaming parameters and a transport entity that handles streaming itself. AVDTP is used by the advanced audio distribution profile to stream music to stereo headsets over a Logical Link Control and Adaptation Layer Protocol (L2CAP) channel intended for the video distribution profile in the BT transmission.

The Advanced Audio Distribution Profile (A2DP), sometimes referred to as BT audio streaming, mandates usage of AVDTP. Most smartphones today are capable of connecting to A2DP devices and transmitting audio. A2DP defines a BT protocol and procedures that realizes distribution of audio content of high-quality audio in mono or stereo on asynchronous connection-less (ACL) channels. A2DP effectively transforms a BT connection into an invisible auxiliary audio cable. For example, using A2DP music can be streamed from a mobile phone, to a wireless headset, hearing aid/cochlear implant streamer, car audio, or streamed from a laptop/desktop to a wireless headset. Voice can be streamed from a microphone device to a recorder.

BT does not have any inherent way to synchronize audio between respective BT devices such as speakers. In the BT SIG specification, a synchronization code is embedded in the preamble of each BT packet to assist the receive device's timing synchronization process for each packet that is received. Unlike WiFi, due to lower relative power used for BT transmissions, BT has very limited broadcast capabilities. Moreover, broadcast in BT is not guaranteed to be received as there is no baseband acknowledgement (ACK) frame provided by the receiving devices. Synchronization can be performed at the device's host processor level which requires significant extra power and is also relatively complicated to implement. Current known audio synchronization solutions generally only support two audio devices configured in a pico-net topology, generally with the master as the audio transmitter and the slave as the sole audio receiver.

SUMMARY

This Summary is provided to introduce a brief selection of disclosed concepts in a simplified form that are further described below in the Detailed Description including the drawings provided. This Summary is not intended to limit the claimed subject matter's scope.

Disclosed embodiments recognize there are numerous user media applications such as audio applications including surround sound, social music playing, jukebox applications, and the Ad-Hoc addition of a speaker to a network of BT speakers, that all seek for separate (non-electrically connected) BT speakers to connect and play from the same audio stream over the same BT connection. For these audio applications to provide good sound quality there is a need for accurate time synchronization for all BT speakers so that when playing they are heard by the user as all playing at the same time, such as over standard BT A2DP. Although disclosed embodiments are generally described for distributing streamed audio from standard A2DP sources, disclosed embodiments can be used for generally any group of BT devices which implement A2DP, such as to synchronize the picture and the speech in a movie.

By configuring the BT media devices in a scatternet and thus in a device chain, and utilizing time synchronization information from each BT controller's local clock and network clock in a new BT packet, the BT controller of the BT devices can receive the media (e.g., audio) stream from an external source device (e.g., an A2DP source such as a mobile phone) via BT and time synchronize the other BT devices (e.g., speakers) in the chain. Disclosed packets can comprise a modified BT SIG AVDTP packet that includes added timing information comprising the packet's play start time including a delay time, and the cumulative drift counted thus far in the device chain (drift is the time difference between each device's local clock and its network clock). The delay time is selected to enable a sufficient time for all the BT speakers in the chain to store a plurality of packets in their memory before initiating playing.

The first BT media device in the BT speaker chain sends a disclosed packet with the timing information to the second BT media device, and the first BT media device is the media device that all other BT media devices in the chain time synchronize to. The first BT media device is the device that the A2DP source is directly connected which can be the media device furthest away physically from the A2DP source, the closest to, or any chain position in between. The stream originator (A2DP source) can be part of the BT media device's synchronized network (if sent by a disclosed BT media device) or it can be a source external to the synchronized network. In the case of audio, disclosed solutions allow distributing streamed audio from standard A2DP sources which can potentially be any A2DP compatible device in generally <30 μsec time synchronization.

One disclosed embodiment comprises a method of BT synchronized media streaming. A plurality of BT media devices are configured in a scatternet chain including a first, second, and at least a third BT media device each including a BT controller comprising a processor running a stored disclosed time synchronization algorithm, and having a local clock and a network clock. A scatternet as known in the art is a type of adhoc computer network comprising two or more piconets. In a scatternet, a slave device can communicate more than one piconet. In connection with operation of a scatternet, the BT master devices may relay the identity of mobile slave devices that are within their individual piconets to its host processor for purposes of tracking the location of a mobile slave device, or the location of a person carrying a mobile device.

The first BT media device formats a first media packet including received media data, second device address, and synchronization information including a packet start time including a delay time value and cumulative clock drift counted thus far in the chain. The second BT media device receives the first packet and formats a second packet including the media data, the third BT media device's address, updated synchronization information for the third BT media device including the second packet's play start time, local clock time of the second BT controller, the second BT controller's clock drift, the delay time, and a cumulative clock drift counted thus far. The second BT media device transmits the second packet to the third BT media device. The synchronization algorithms each begin synchronized playing of the media data including the first BT media device playing after the delay time is reached, the second BT media device playing after the first packet's play start time is reached, and the third BT media device playing after the second packet's play start time is reached.

BRIEF DESCRIPTION OF THE DRAWINGS

Reference will now be made to the accompanying drawings, which are not necessarily drawn to scale, wherein.

DETAILED DESCRIPTION

Example embodiments are described with reference to the drawings, wherein like reference numerals are used to designate similar or equivalent elements. Illustrated ordering of acts or events should not be considered as limiting, as some acts or events may occur in different order and/or concurrently with other acts or events. Furthermore, some illustrated acts or events may not be required to implement a methodology in accordance with this disclosure.

Also, the terms "coupled to" or "couples with" (and the like) as used herein without further qualification are intended to describe either an indirect or direct electrical connection. Thus, if a first device "couples" to a second device, that connection can be through a direct electrical connection where there are only parasitics in the pathway, or through an indirect electrical connection via intervening items including other devices and connections. For indirect coupling, the intervening item generally does not modify the information of a signal but may adjust its current level, voltage level, and/or power level.

Figure 1:
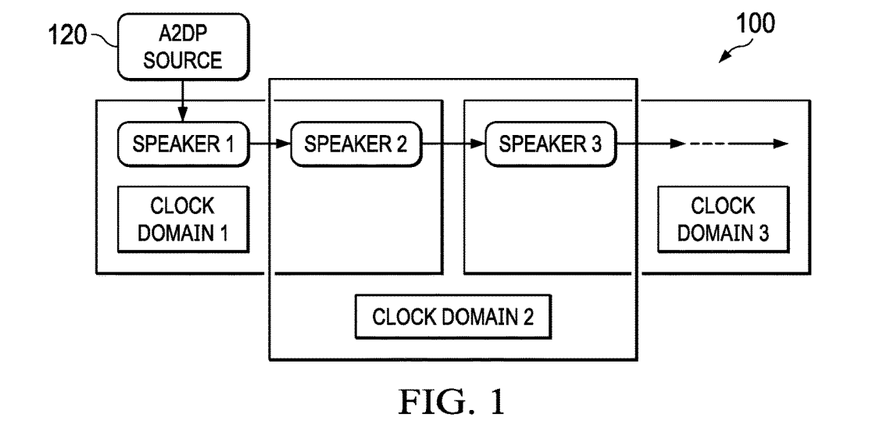
FIG. 1 shows an example audio network including a plurality of BT speakers configured in a chain including a first BT speaker, a second BT speaker, and at least a third BT speaker that are all within a BT range with at least one of the BT speakers, where the first BT speaker receives a stream of encoded audio data from a BT digital audio stream sending device shown as an A2DP source.

FIG. 1 shows an example media network shown as an audio network 100 including a plurality of BT speakers configured in a chain including a first BT speaker shown as speaker 1, a second BT speaker shown as speaker 2 and at least a third BT speaker shown as speaker 3, that are all within a BT range of their BT speaker neighbors. The first BT speaker receives a stream of encoded audio data from a BT digital audio stream sending device shown as an A2DP source 120. The BT speaker chain sets up a master-slave relationship between adjacent BT speakers. The BT speakers are first wirelessly connected with each other to create the speaker network chain (a scatternet), and each packet is being processed by the BT devices as any other audio packet would be processed with the exception that each packet is being sent down the chain with an updated timestamp to the next BT speaker in line in order to time synchronize the BT speakers. In the case the BT media device comprises BT speakers as shown in FIG. 1, the BT speakers can be either mono or stereo speakers.

No manipulation is being carried out to the received stream by the BT speakers. The stream is being processed, its headers are being changed to contain time synchronization information, and the stream is then being sent to the next BT device in chain to perform the same action. In the case of speakers the arrangement can be thought of as a chain of speakers, where one of them is connected to an A2DP audio source and the same audio is flowing through the speaker devices in the network.

Clock domains are shown between adjacent BT speakers in the speaker chain, with clock domain 1, 2, 3 each configured as master-slave pairs, with clock domain 1 shown between speaker 1 and speaker 2, clock domain 2 shown between speaker 2 and speaker 3, and the clock domain 3 shown between speaker 3 and speaker 4 (not shown). The respective clock domains are set by the master speaker device in each pair that sets the network clock of its slave speaker device with its local clock which is sent as packet play time information (e.g., in the SSRC field, see the SSRC field 210 in example media packet 200 shown in FIG. 2) of a disclosed packet that also includes the media data as its payload.

Speaker 1 being the first speaker in the chain is only a master in the clock domain 1 that is shared with speaker 2 that is a slave device in clock domain 1. The network clock of speaker 2 is set to the local clock of speaker 1 which being the first speaker=its network clock. Speaker 2 is a master in the clock domain 2 shown with speaker 3 being the slave device in clock domain 2, so that the local clock of speaker 2 (being the master) is used as the network clock of speaker 3. Speaker 3 is a master in clock domain 3 with speaker 4 (not shown) being the slave device in clock domain 3. As described in more detail below, clock domains are accomplished by a packet transmission from the master device to slave device, where a disclosed packet (see the media packet 200 shown in FIG. 2 described below) sent from the master to the slave device includes the packet's play start and the cumulative clock drift (difference) counted thus far. The BT clocks can comprise a crystal oscillator, ceramic resonator, RC (resistor, capacitor) feedback oscillator, or a silicon oscillator.

Figure 2:
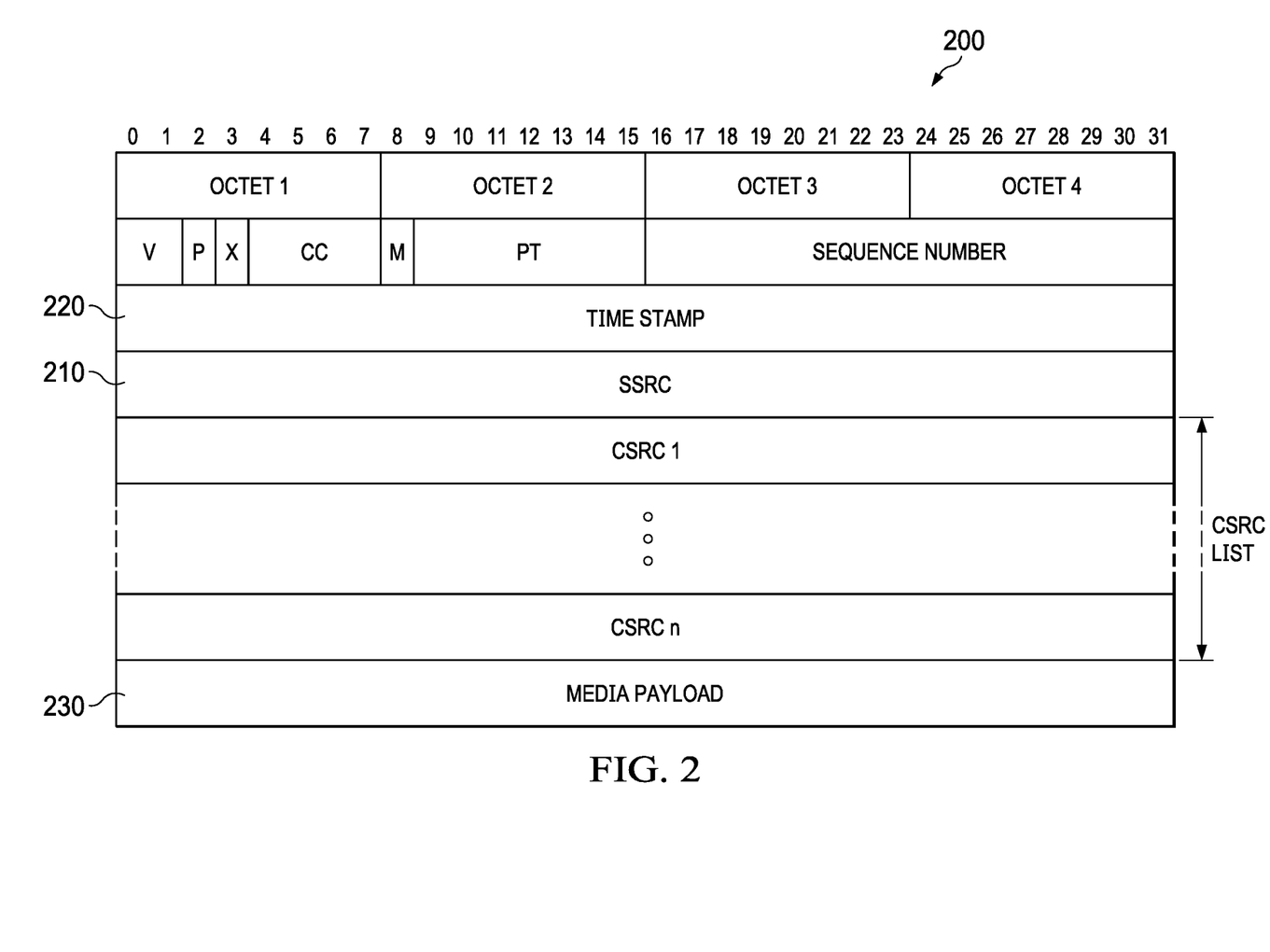
FIG. 2 shows an example disclosed media packet with the preamble configured to have the synchronization source (SSRC) field contain the packet's play start time and also the cumulative drift counted thus far, as well as a media payload field.

FIG. 2 shows an example disclosed media packet 200. Media packet 200 is shown utilizing the existing SSRC field 210 in the preamble of the BT packet, where the BT controller reads the received BT clock from its peer BT media device, transforms it to the BT media device's local time, and then stores it in the SSRC field 210 before sending it to the next BT media device in the chain. The time stamp field 220 is used to store the cumulative speaker's drift. There is also a media (e.g., audio) payload field 230.

Although described using the preamble, the time synchronization information may be stored elsewhere in the packet, such as at the beginning of the media payload field 230. The SSRC field 210 and time stamp field 220 are both shown by example as being 32 bits. The csrc list shown is an array of 16 (binary 0 to 15) contributing source (CSRC) elements identifying the contributing sources for the payload contained in this packet. Media packet 200 shows how a SSRC field 210 in a conventional BT A2DP packet can be used to reflect the reading of the received BT clock from a peer (previous speaker device (as a master) in the chain) BT speaker, transforming it to the speaker's local time, and storing it again to the SSRC field 210 of the packet before sending the packet to the next BT speaker in chain. The time stamp field 220 is used to store the cumulative speaker's drift.

As known in BT, the BT clock comprises two fields, a BT clock which ticks at a frame resolution, and packet timer (PT) which ticks at a microseconds rate. For example, every 1,250 microseconds, 1 frame has passed, which is one BT clock tick. An information element is stored in the SSRC field 210 including the BT clock and PT which can collectively comprise 27 bits, with the remaining 5 bits (for a 32 bit field) being used to store the intended receiving media device's (e.g., a speaker's) address identification to identify for whom this packet should be sent over a physical bus (e.g., a pulse-code modulation (PCM) bus). The packet media payload 230 generally contains PCM-encoded audio samples. This physical bus is not just a physical bus over the air, since the drift between the BT speaker's clocks are accounted for in packet 200.

Figure 3A:
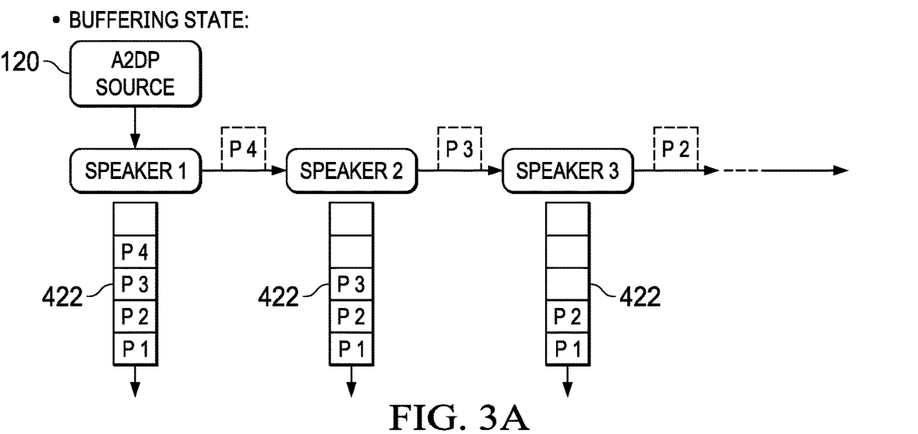
FIG. 3A shows disclosed synchronization signaling used the audio network shown in FIG. 1 in a buffering state for having the BT speakers start playing at essentially the same time by utilizing packets including the packet's play start time including the local clock from the peer (master) device and a delay time that enables all BT speakers to store a plurality of packets in their memory before begin speaking, and the cumulative clock drift.

FIG. 3A shows disclosed synchronization signaling used in the audio network 100 shown in FIG. 1 in the buffering state. The buffering state stores packets in the memory 422 (e.g., a data buffer) of each BT speaker and has the respective BT speakers start playing audio at essentially the same time by sending the time synchronization data (using packets shown as P4, P3, P2, and P1) between the BT speakers that include a delay time in advance of playing by the beginning of music play say ~100 ms (a delay time) into the future, and time synchronizing the respective speakers using their local BT clocks which each tend to clock differently.

P4, P3, P2 are shown transmitted from master to slave speaker device in each pair that as described each BT speaker uses packets that includes a packet play time (including a delay time) which reflects reading the received BT clock from its peer (master) BT speaker, transforming it to the BT speaker's local clock time, and then storing it in the SSRC field 210, along with a time stamp field 220 that has the cumulative speaker's drift, before sending it to the next BT speaker in the chain to enable all BT speakers to begin speaking at the same time. Once the mark (the packet play time) is reached, all the respective BT speakers starts playing the same audio data, all at essentially the same time. This means each BT device waits for the exact BT clock and PT clock (where the BT clock counts in slots, with each slot say 1,250 μsec, and where the PT clock counts in μsec) so when the exact BT clock correct μsec value within that slot is reached, playing is begun. For each BT speaker, the BT clock and PT clock times received from master device are given in terms of the slave's network clock 409, and being forwarded in terms of the local clock 408 (see these clocks in FIG. 4A described below). At this point, all BT speaker's state is changed to playing for enabling the playing of the audio sample.

Figure 3B:
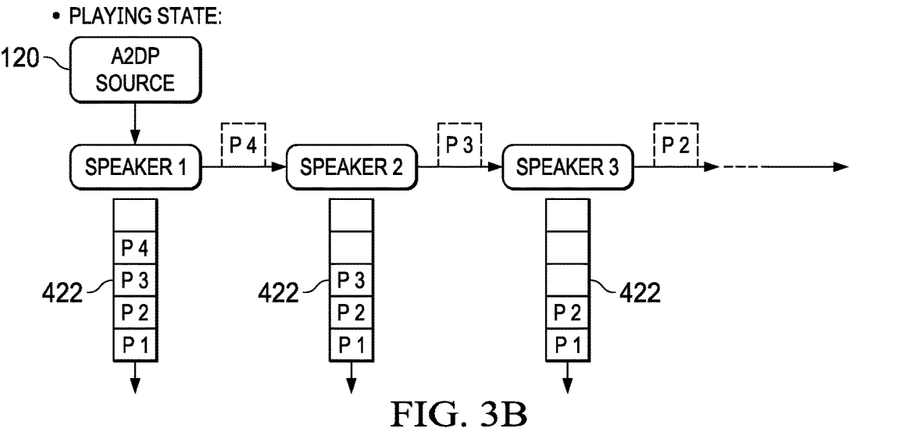
FIG. 3B shows disclosed synchronization signaling comprising sending a packet including control data for adjusting the drift between BT speakers used in the audio network shown in FIG. 1 in the playing state by tracking the drift between network clocks, and compensating for this drift-based error. As with the buffering state depicted in FIG. 3A each packet includes the packet's play start to indicate when it's playing is due to occur.

FIG. 3B shows disclosed synchronization signaling comprising sending control data to adjust the drift between the speakers used in the audio network 100 shown in FIG. 1 in the playing state for having the BT speakers track the drift between network clocks, and compensating for this drift-based timing error. As with the buffering state depicted in FIG. 3A, each packet includes the packet's play start time including the delay time to indicate when it's playing is due to occur.

Figure 4A:
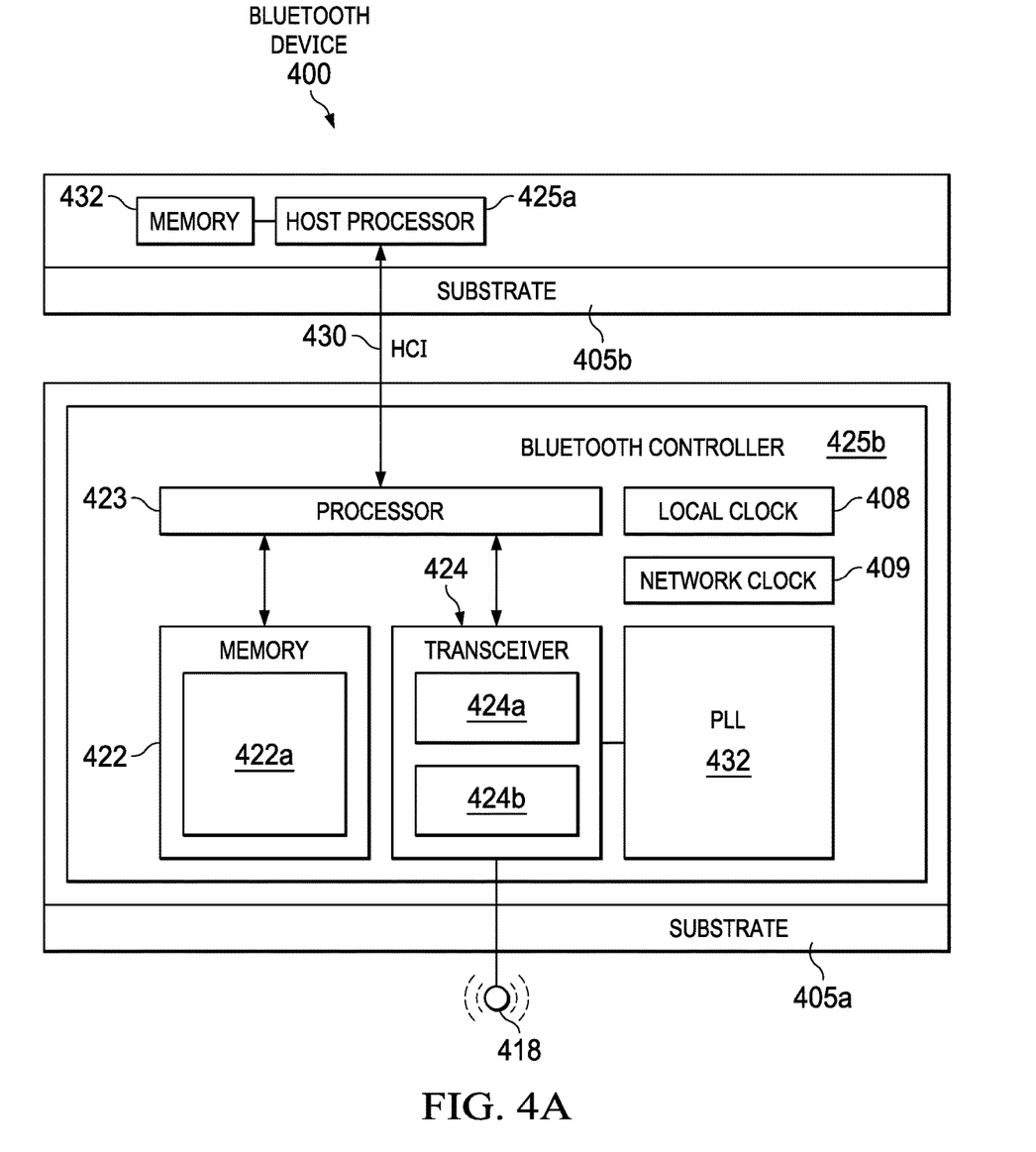
FIG. 4A is a block diagram schematic of an example BT media device that implements disclosed BT media device time synchronization.

FIG. 4A shows a system block diagram representation for an example BT media device 400 that generally conforms to the BT communications standard. The BT media device 400 is generally formed on at least one integrated circuit (IC) shown formed on a substrate 405*a* having a semiconductor surface for the BT controller 425*b* and on another substrate 405*b* having a semiconductor surface for the host processor 425*a*. The BT media device 400 may be any device that can engage in BT communications. Such BT media devices may be, may include, or may be a part of, mobile phones such as smartphone, tablets, computers, personal digital assistants, cameras, and household items with communication capabilities such as window blinds, and motion sensors. The BT media device 400 communicates along with a plurality of other BT media devices in a BT network configured as a scatternet and thus in a device chain.

The BT media device 400 comprises a host processor 425*a* and a BT controller 425*b* that communicate with one another over the HCI 430. The host processor 425*a* includes a memory 432 that stores HCI FW including HCI command code. The BT controller 425b includes a processor 423, a memory 422 including software 422a comprising source code for parsing, understanding, and acting on commands from the host processor 425a, and a transceiver 424 including an RF driver 424a that is adapted to be coupled to an antenna 418 which is generally off chip. The processors can comprise a digital signal processor (DSP) or microcontroller. The processors collectively implement a BT protocol stack for BT media operations. The BT media device 400 also includes a local clock 408 and a network clock 409.

The transceiver 424 is also shown including hardware comprising digital logic 424b that can be used as an alternative to the software 422a for implementing disclosed synchronization. As known in the art the transceiver 424 includes a transmitter and a receiver. The transmitter generally comprises a media access control (MAC) module, an encoder, a modulator, an Inverse Fast Fourier Transform (IFFT) unit, a digital to analog conversion (DAC)/filter module, and an RF/antenna module. The receiver generally comprises an RF/antenna unit, an analog to digital conversion (ADC)/filter unit, a FFT unit, a demodulator, a decoder, and a MAC module.

The memory 422 is more generally configured to store information including data, instructions, or both. The memory 422 may be any storage medium accessible by the processor 423, such as a read only memory (ROM), a random access memory (RAM), a register, cache memory, or magnetic media device such as internal hard disks and removable disks. A phase lock loop (PLL) 432 is also provided for purposes including mixing and frequency synthesis.

The processor 423 is coupled to the memory 422 and to the transceiver 424. In some implementations, the transceiver 424 comprises baseband units (not shown in FIG. 4A, but see FIG. 4B) and analog units (not shown) to transmit and receive RF signals. The baseband unit may comprise hardware to perform baseband signal processing including digital signal processing, coding and decoding, modulation, and demodulation. The analog unit may comprise hardware to perform analog-to-digital conversion (an ADC), digital to analog conversion (a DAC), filtering, gain adjusting, up-conversion, and down-conversion.

The analog unit may receive RF signals from an access point and down-convert the received RF signals to baseband signals to be processed by the baseband unit, or receive baseband signals from the baseband unit and up-convert the received baseband signals to RF wireless signals for uplink transmission. The analog unit comprises a mixer to up-convert the baseband signals and down-convert the RF signals with a carrier signal oscillated at the radio frequencies of the BT network. The data rate utilized by the BT media device 400 may be in the current BT frequency band of 2.472 GHz to 2.479 GHz, or any future BT frequency band utilized.

Figure 4B:
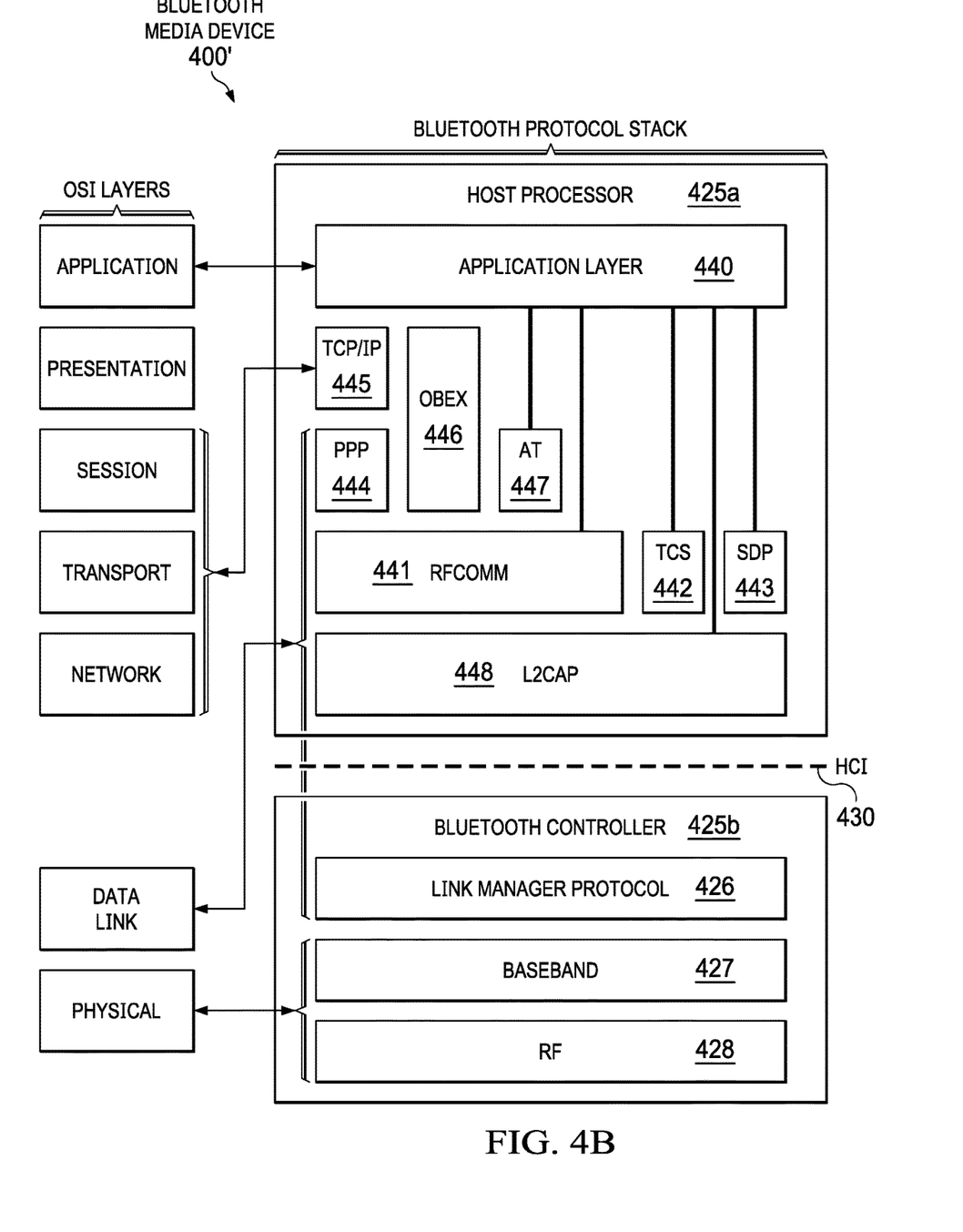
FIG. 4B is a block diagram schematic of a disclosed BT media device including a separate host processor and BT controller coupled to one another by a Host Controller Interface (HCI), where the BT controller includes firmware (FW) for implementing disclosed speaker chain time synchronization, according to an example embodiment.

FIG. 4B is a functional layer depiction of the BT media device 400 shown in FIG. 4A now shown as 400' showing the host processor 425a including an application layer 440 including BT applications and a Logical Link Control and Adaptation Layer Protocol (L2CAP) layer 448. The BT protocol RFCOMM block 441 is a simple set of transport protocols, made on top of the L2CAP layer 448. The Telephony Control Protocol Specification (TCS) 442 defines ways to send audio calls between BT devices. The Service Discovery Protocol (SDP) 443 is a specification that defines a way to represent a range of UUIDs (which are nominally 128 bits) in a shorter form. The Point-to-Point Protocol (PPP 444) is a data link (layer 2) protocol used to establish a direct connection between two nodes. The Transmission Control Protocol/Internet Protocol (TCP/IP) 445 enables the BT device to carry TCP/IP traffic, the OBEX 446 is a communications protocol that facilitates the exchange of binary objects between BT devices, and the AT Commands interface (AT) 447 is a commands interface comprising a series of machine instructions used to activate features on an analog modem.

The BT controller 425b is shown including link manager protocol (LMP) 426, a baseband section and an RF section that are part of the transceiver 424 shown in FIG. 4A. The BT controller 425b is also shown including baseband circuitry 427 and RF circuitry 428. LMP 426 controls and negotiates all aspects of the operation of the BT connection between two adjacent BT media devices.

Disclosed time synchronization can be performed entirely by the BT controller, therefore no host processor is needed to synchronize the BT media devices, thus saving power. The Sync level is generally ~30 μsec at beginning of play which is unaccounted time between software executing a command and the hardware output data of the BT media device on the physical bus lines, such as PCM lines. The drift level is about 4 msec per hour which is the cumulative error in the time synchronization algorithm's activity for relatively long time periods. The audiophile human ear can detect a shift at ~20 msec which means the performance level for audio synchronization between the BT speakers in the network is more than adequate.

By scheduling the beginning of audio or audio with associated video (e.g., as noted above synchronization between a source device and a sink device can also be used to synchronize a picture and speech in a movie) to begin playing after a delay time ~100 ms (into the future) so that other BT speakers in the chain have time to buffer an ample amount of samples, before starting to play. This 100 ms parameter has been tested, and performs well with up to 6 BT speakers. However, this delay time is generally configurable by user. By sending packets with the audio as well as the delay time to the speakers in advance and synchronizing the speakers using the BT clocks, the speakers can synchronize and begin playing audio at essentially the same time (~30 μsec difference).

Disclosed embodiments can support 6 or more speakers while other solutions as described above support only 2 BT media devices (master and 1 slave). In general, there is no limitation on the number of speakers in the chain. In practice disclosed networks are limited to 6 BT devices due to solely internal device memory limitations. Given more memory, one can add more speakers to the network. Other BT speaker solutions use a pico-net star topology while disclosed embodiments use a scatternet topology.

Disclosed solutions also enable packet retries to send data and sufficient time to recover if any packets have to be retransmitted. Compared to the other known synchronization solutions, disclosed embodiments have advantages including while all other synchronization solutions provide synchronization on milli-second resolution, disclosed embodiments provide micro second resolution. Moreover, as described above disclosed synchronization can be used for 6 or more synchronized BT speakers, while other solutions are limited to only 2 synchronized BT speakers.

Figure 5:
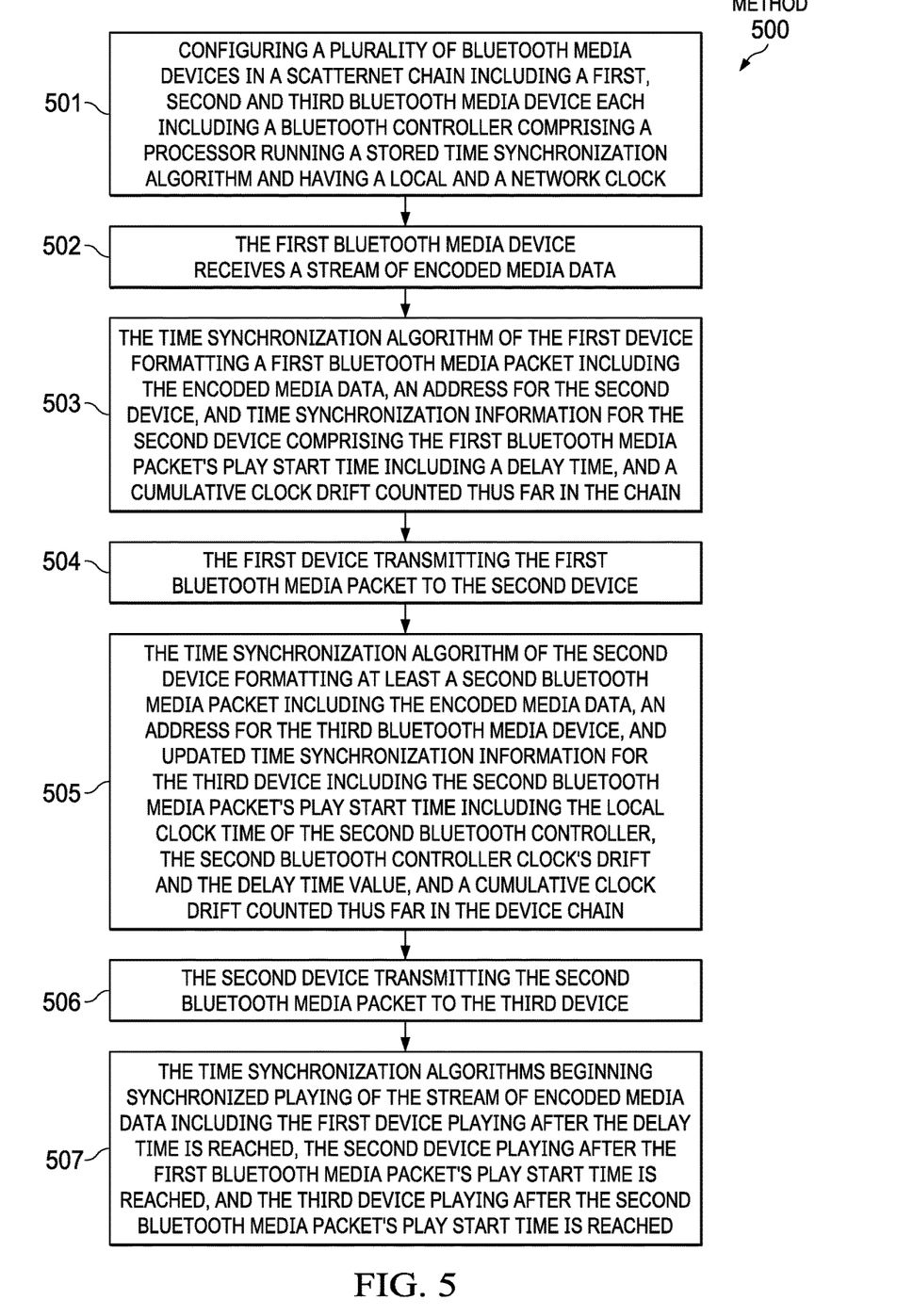
FIG. 5 is a flowchart for an example method of BT synchronized media streaming for a media network including a plurality of BT media devices, according to an example embodiment.

FIG. 5 is a flowchart for an example method 500 of BT synchronized media streaming, according to an example embodiment. Step 501 comprises configuring a plurality of BT media devices in a scatternet chain including a first, second and third BT media device each including a BT controller comprising a processor running a stored time synchronization algorithm and having a local and a network clock. Step 502 comprises the first BT media device receiving a stream of encoded media data from a BT digital media stream sending device. Step 503 comprises the time synchronization algorithm of the first device formatting at least a first BT media packet including the encoded media data, an address for the second BT media device, and time synchronization information for the second BT media device comprising the first BT media packet's play start time including a delay time, and a cumulative clock drift counted thus far in the chain.

Step 504 comprises the first BT media device transmitting the first BT media packet to the second BT media device. Step 505 comprises the time synchronization algorithm of the second BT media device formatting at least a second BT media packet including the encoded media data, an address for the third BT media device, and updated time synchronization information for the third BT media device including the second BT media packet's play start time including the local clock time of the second BT controller, the second BT controller clock's drift and the delay time value, and a cumulative clock drift counted thus far in the device chain. Step 506 comprises the second BT media device transmitting the second BT media packet to the third BT media device. Step 507 comprises the time synchronization algorithms beginning synchronized playing of the stream of encoded media data including the first BT media device playing after the delay time is reached, the second BT media device playing after the first BT media packet's play start time is reached, and the third BT media device playing after the second BT media packet's play start time is reached.

The delay time is generally at least 50 msec and is selected to enable sufficient time for all BT media devices to store a predetermined plurality of BT media packets in their memory before initiating playing. When the BT media devices comprise BT A2DP speakers they can span a plurality of different rooms that are in a BT range by invoking an application programming interface (API) to enable multi-room speaker operation. The plurality of BT media devices generally provide a synchronization level of <50 µsec at a beginning of synchronized playing and maintain this synchronization level during playing.

EXAMPLES

Disclosed embodiments are further illustrated by the following specific Examples, which should not be construed as limiting the scope or content of this Disclosure in any way.

Disclosed time synchronization for a BT media scatternet chain of 6 BT speaker was used with a BT audio packet having an audio sample and time synchronization information using a delay time of ~100 ms (into the future) so that all other BT speakers in the chain have sufficient time to buffer an ample amount of packet samples before starting to play. The BT speakers all began playing the same audio samples at the essentially the same time, being within a 30 µsec difference. After beginning to play, the first BT speaker sends an updated BT audio packet including a drift value between its local and network clocks to the second BT speaker, and the second BT speaker sends an updated BT audio packet including a drift value between its clocks to the third BT speaker, etc., wherein the clock drift value is used to change a time for 'speaking' that compensates for the clock drift.

Figure 6:
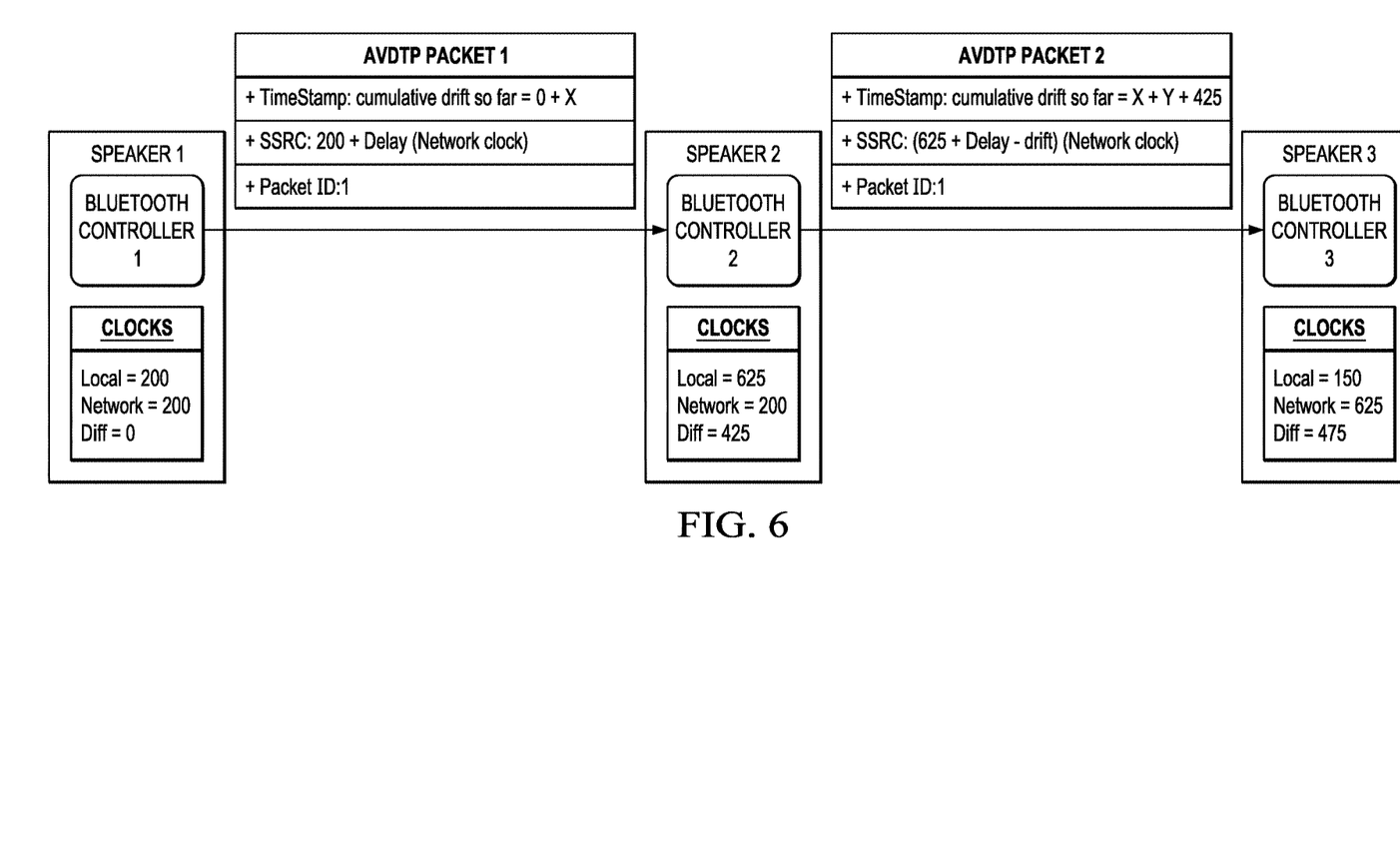
FIG. 6 shows an example simplified example showing disclosed BT media device synchronization for a 3 speaker example.

FIG. 6 shows a simplified audio example showing audio packets 1 and 2 (shown as AVDTP packets 1 and 2) having disclosed time synchronization information for a 3 BT speaker device chain example. The BT speaker devices as described above each include a BT controller running a stored synchronization algorithm in FW, and both devices have a local clock and a network clock. The BT controller 1 of speaker device 1 receives a stream of encoded audio data from a BT digital audio stream sending device, such as an A2DP source.

The BT controller 1 is shown having its local clock also used as its network clock thus only having a single (same) clock as it is the first device in the chain, which is shown with a time of 200 µs, so there is no clock difference. BT controller 1 formats an AVDTP packet shown as AVDTP packet 1 based on the example media packet 200 shown in FIG. 2 where the SSRC field 210 represents the 200 µs time value from its local clock and the delay time value (delay) such as 100 msec.

The timestamp field 220 stores the cumulative speaker's drift that is zero at this point in the chain being the first speaker device in the chain. 'X' shown in FIG. 6 is the drift between the audio source's local clock (not shown) and BT controller 1's local clock. The Packet ID shown provides a unique identification (ID) for each packet that enables making sure the packets are received in a sequential order and to be able to know that a packet wasn't lost on the way. The same difference is also calculated for each packet. Although not shown, AVDTP packet 1 has a media payload containing Pulse-code modulation (PCM)-encoded audio samples and is addressed to identify the speaker device 2 including BT controller 2 for whom AVDTP packet 1 is addressed which is sent over a physical bus such as a PCM bus.

The speaker 2 device including BT controller 2 is shown receiving AVDTP packet 1. BT controller 2 is shown having its local clock time at 625 µsec and its network clock time at 200 µsec (the network clock time is received from BT controller 1=BT controller 1's local clock time), so BT controller 2 has a clock difference (or clock drift) of 425 µsec. BT controller 2 formats an AVDTP packet shown as AVDTP packet 2 as with AVDTP packet 1 again based on the example media packet 200 shown in FIG. 2, where the SSRC field 210 provides a packet 2 play start time that reflects the local clock of BT controller 2 (625 µsec)– (minus) its clock drift (425 µsec) and the delay time value.

BT controller 2 thus transforms the received BT clock time of 200 µsec from BT speaker device 1 into the speaker 2's local time, and stores this time synchronization information in the SSRC field 210 of AVDTP packet 2. AVDTP packet 2 is also formatted to include an updated cumulative clock drift so far in the chain in the time stamp field 220 comprising X (from AVDTP packet 1), and Y which is the drift between the BT controller 1's local clock and BT controller 2's local clock, and there is shown a cumulative clock drift of 425 µsec (a 0 value from BT controller 1 and a 425 µsec value from BT controller 2). Although not shown, AVDTP packet 2 has a payload containing the same PCM-encoded audio samples and is addressed to identify speaker device 3 for whom AVDTP packet 2 is addressed which is sent over a physical bus such as PCM bus.

The speaker 3 device including BT controller 3 is shown receiving AVDTP packet 2. BT controller 3 is shown having a local clock time of at 150 µsec and its network clock time of 625 µsec (BT controller 2's local clock time), so the BT controller 3 has a clock difference of 475 µsec. BT controller 3 calculates the AVDTP packet 2's play start time that reflects the local clock of BT controller 3 (150 µsec)–(minus) its clock drift (475 µsec) and the delay time value.

The respective time synchronization algorithms begin synchronized playing of the same PCM-encoded audio samples including the first BT speaker playing after the delay time is reached, the second BT device begins playing after the AVDTP packet 1's play start time is reached, and the third BT media device begins playing after the AVDTP packet 2's play start time is reached. AVDTP packet 1 and AVDTP packet 2 have the same packet ID and same audio data, and only have different packet timing data on the packet. The respective speakers all begin within a <30 µsec time synchronization at the beginning of play so that BT speakers begin playing at essentially the same time the same audio data. Moreover, as described above, as with the buffering state describe above, during playing each packet gets time stamped to indicate when it's playing is due, and time synchronization between the speakers is maintained after playing has begun by tracking the drift between the network clocks and compensating for this source of time synchronization error.

Those skilled in the art to which this disclosure relates will appreciate that many other embodiments and variations of embodiments are possible within the scope of the claimed invention, and further additions, deletions, substitutions and modifications may be made to the described embodiments without departing from the scope of this disclosure. For example, although disclosed solutions are described for distributing streamed audio from standard A2DP sources, they can be used for more generally any group of devices which implements A2DP, such as to synchronize the picture and speech in a movie, for example.

The invention claimed is:

1. A method comprising:
    receiving, by a first device, encoded media data; and
    transmitting, by the first device, a packet comprising the encoded media data, an address for a second device, and time synchronization information, wherein the time synchronization information comprises a play start time of the packet, a delay time of the packet, and a clock drift.

2. The method of claim 1, further comprising playing the encoded media data after the delay time.

3. The method of claim 1, wherein the delay time is at least 50 msec.

4. The method of claim 1, wherein the first device is a Bluetooth advanced audio distributed profile (A2DP) speaker and the encoded media data comprises A2DP audio data.

5. The method of claim 1, wherein a preamble of the packet comprises the time synchronization information.

6. A method comprising:
    receiving, by a first device from a second device, a first packet comprising encoded media data, an address of the first device, and first time synchronization information, wherein the first time synchronization information comprises play start time of the first packet, a delay time of the first packet, and a clock drift; and
    transmitting, by the first device to a third device, a second packet, the second packet comprising the encoded media data, the second packet comprising the encoded media data, an address for the third device, and second time synchronization information, the second time synchronization information comprising a play start time of the second packet, including a time of a local clock of the first device, a drift of the local clock of the first device, a delay time value of the local clock of the first device, and a clock drift of the local clock of the first device and a local clock of the second device.

7. The method of claim 6, further comprising playing the encoded media data after the play start time.

8. The method of claim 6, wherein the delay time is at least 50 msec.

9. The method of claim 6, wherein the first device is a Bluetooth advanced audio distributed profile (A2DP) speaker and the encoded media data is an A2DP audio data source.

10. The method of claim 6, wherein a preamble of the first packet comprises the first time synchronization information and a preamble of the second packet comprises the second time synchronization information.

11. A device comprising:
    a processor; and
    a non-transitory computer readable storage medium storing a program for execution by the processor, the program including instructions to:
        receive, from a second device, a first packet comprising encoded media data, an address of the device, and first time synchronization information, wherein the first time synchronization information comprises play start time of the first packet, a delay time of the first packet, and a clock drift; and
        transmit, to a third device, a second packet, the second packet comprising the encoded media data, the second packet comprising the encoded media data, an address for the third device, and second time synchronization information, the second time synchronization information comprising a play start time of the second packet, including a time of a local clock of the device, a drift of the local clock of the device, a delay time value of the local clock of the device, and a clock drift of the local clock of the device and a local clock of the second device.

12. The device of claim 11, wherein the instructions further comprise instructions to play the encoded media data after the play start time.

13. The device of claim 11, wherein the delay time is at least 50 msec.

14. The device of claim 11, wherein first device is a Bluetooth advanced audio distributed profile (A2DP) speaker and the encoded media data is an A2DP audio data source.

15. The device of claim 11, wherein a preamble of the first packet comprises the first time synchronization information and a preamble of the second packet comprises the second time synchronization information.

* * * * *